(12) United States Patent
Sato (10) Patent No.: US 9,200,340 B2
(45) Date of Patent: Dec. 1, 2015

(54) PUSHER

(75) Inventor: Yasuhiro Sato, Yokohama (JP)

(73) Assignee: JP STEEL PLANTECH CO., Yokohama-shi (JP)

( * ) Notice: Subject to any disclaimer, the term of this patent is extended or adjusted under 35 U.S.C. 154(b) by 539 days.

(21) Appl. No.: 13/522,401

(22) PCT Filed: Feb. 25, 2011

(86) PCT No.: PCT/JP2011/055005
§ 371 (c)(1),
(2), (4) Date: Jul. 16, 2012

(87) PCT Pub. No.: WO2011/118365
PCT Pub. Date: Sep. 29, 2011

(65) Prior Publication Data
US 2012/0292835 A1    Nov. 22, 2012

(30) Foreign Application Priority Data

Mar. 26, 2010  (JP) ................. 2010-071323
Apr. 15, 2010  (JP) ................. 2010-094056

(51) Int. Cl.
*F27D 3/04*  (2006.01)
*C21C 5/52*  (2006.01)
(Continued)

(52) U.S. Cl.
CPC .............. *C21C 5/527* (2013.01); *C21C 5/565* (2013.01); *F27B 3/186* (2013.01); *F27D 3/04* (2013.01); *F27D 13/002* (2013.01); *F27D 17/004* (2013.01); *F23G 2205/101* (2013.01)

(58) Field of Classification Search
CPC ....... F27D 3/04; F27D 13/002; F27D 17/004; C21C 5/527; C21C 5/565; F23G 2205/101; F27B 3/186; B65G 25/08
USPC .......... 266/242; 432/239; 198/736; 110/213
See application file for complete search history.

(56) References Cited

U.S. PATENT DOCUMENTS 3,595,406 A * 7/1971 Kennedy ................. 414/181
3,749,031 A * 7/1973 Burden, Jr. ............. 110/213
4,854,959 A * 8/1989 Waltert .................. 65/335

FOREIGN PATENT DOCUMENTS

CN    2864189 Y    1/2007
JP    61-295411    * 6/1985 ............ F23G 5/44
(Continued)

OTHER PUBLICATIONS

Combined Chinese Office Action and Search Report issued Feb. 17, 2013 in Patent Application No. 201010146951.1 (with partial English language translation).
(Continued)

*Primary Examiner* — Scott Kastler
*Assistant Examiner* — Michael Aboagye
(74) *Attorney, Agent, or Firm* — Oblon, McClelland, Maier & Neustadt, L.L.P.

(57) ABSTRACT

A pusher includes a pusher main body configured to push forward a target object; a pusher main body cylinder connected to the pusher main body and configured to move the pusher main body forward and backward; a pusher carriage connected to the pusher main body cylinder; and a pusher carriage cylinder connected to the pusher carriage and configured to move the pusher carriage forward and backward, the pusher carriage cylinder having a pushing-out direction opposite to a pushing-out direction of the pusher main body cylinder.

9 Claims, 7 Drawing Sheets

(51) Int. Cl.
*C21C 5/56* (2006.01)
*F27B 3/18* (2006.01)
*F27D 13/00* (2006.01)
*F27D 17/00* (2006.01)

(56) References Cited

FOREIGN PATENT DOCUMENTS

| | | |
|---|---|---|
| JP | 61 127398 | 8/1986 |
| JP | S61-295411 A | 12/1986 |
| JP | 7 180975 | 7/1995 |
| JP | 11 257859 | 9/1999 |
| JP | 2005 121304 | 5/2005 |
| SU | 1218283 A1 | 3/1986 |
| WO | WO 95/04250 A1 | 2/1995 |

OTHER PUBLICATIONS

International Search Report Issued Apr. 12, 2011 in PCT/JP11/55005 Filed Feb. 25, 2011.

Office Action issued in Chinese Patent Application No. 201010146951.1 mailed on Sep. 2, 2013 (with partial English translation).

Extended European Search Report issued in European Patent Application No. 11 759 173.5 mailed on May 9, 2014.

\* cited by examiner

PUSHER

TECHNICAL FIELD

The present invention relates to a pusher that pushes forward a target object to feed or transfer the target object.

BACKGROUND ART

For example, as an electric arc melting facility for melting a source iron, such as scrap, there is known an electric arc melting facility structured to continuously feed a source iron, such as scrap, and to use exhaust gas to preheat the source iron to be charged (for example, Patent Document 1). This electric arc melting facility includes a melting chamber for melting the source iron, a preheating chamber directly connected to an upper side of the melting chamber and configured to preheat the source iron by the exhaust gas generated in the melting chamber, an arc-generating electrode for melting the source iron in the melting chamber, a source iron feeding means for feeding the source iron to the preheating chamber, and a tap hole formed in the melting chamber. Further, a thrusting device or pusher is disposed at a lower side of the preheating chamber and configured to feed or transfer the source iron from inside the preparatory chamber into the melting chamber.

In general, a pusher of this type includes a pusher main body for pushing forward the push-target object, i.e., source iron, and a cylinder, such as a hydraulic cylinder, for driving the pusher main body. The pusher main body is inserted into and retracted from the preparatory chamber by the cylinder to feed the source iron into the melting chamber.

According to the electric arc melting facility described in the Patent Document 1, the source iron is continuously or intermittently fed to the preheating chamber to maintain a state in which the source iron exists continuously over the preheating chamber and the melting chamber. Along with this operation, the pusher is inserted into and retracted from the preheating chamber charged with the source iron to feed the source iron from inside the preheating chamber into the melting chamber. The source iron is melted by the electric arc inside the melting chamber, and the melting chamber is thereby filled with molten steel, at which time the pusher is stopped. Then, the molten steel is heated by the arc to increase the temperature thereof, and is tapped while the source iron exists continuously over the preheating chamber and the melting chamber.

PRIOR ART DOCUMENT

Patent Document

[Patent Document 1]
Jpn. Pat. Appln. KOKAI Publication No. 11-257859

SUMMARY OF INVENTION

Technical Problem

The pusher used in the electric arc melting facility described in the Patent Document 1 requires the cylinder to move the pusher main body with a long stroke between a retreat position retreated from the preparatory chamber and a pushing position closer to the melting chamber. Accordingly, the cylinder is inevitably long at the cylinder main body, which is disposed to protrude outward from the preparatory chamber, thereby resulting in a large installation space. In light of this, it is desirable to provide a pusher with a more compact structure and result in a smaller installation space.

Further, in general, the push-target object, i.e., source iron, consists of matters having indeterminate forms, such as scrap. Thus, the pusher shown in Patent Document 1 may cause a problem such that, when the pusher main body is moved toward the inside of the furnace (forward: pushing direction) to charge the source iron, part of the source iron is caught in the clearance gap between the pusher main body and the floor face and hinders the movement of the pusher main body. When restraint of this kind occurs on the pusher main body, an operation is made of moving the pusher main body toward the outside of the furnace (backward: pulling direction). However, in general, the mechanism of cylinders is structured such that the pulling direction force is smaller than the pushing direction force, because of the relationship between the bore diameter of the cylinder (cylinder diameter) and the rod diameter. Thus, it may become difficult to move the pusher main body backward, depending on the degree of the restraint. This restraint occurrence can be addressed by increasing the driving force of the pusher, but this countermeasure makes it necessary to enlarge the bore diameter of the cylinder (cylinder diameter) in general. The cylinder diameter should be originally determined in light of the thrusting force, and an increase in the cylinder diameter more than necessary is against demands to provide a more compact structure and result in a smaller installation space.

As described above, the pusher is required to have a larger driving force for moving the pusher main body backward without increasing the cylinder diameter against the demands to provide a more compact structure or smaller installation space. Such a request should be present not only for pushers used in electric arc melting facilities but also for pushers used in other applications to some extent.

Accordingly, an object of the present invention is to provide a pusher that can have a larger driving force for moving the pusher main body backward without increasing the cylinder diameter, and so it can provide a more compact structure and result in a smaller installation space.

Solution to Problem

In order to solve the problem described above, the present invention provides the following subject matters (1) to (9).

(1) A pusher comprising:
a pusher main body configured to push forward a target object;
a pusher main body cylinder connected to the pusher main body and configured to move the pusher main body forward and backward;
a pusher carriage connected to the pusher main body cylinder; and
a pusher carriage cylinder connected to the pusher carriage and configured to move the pusher carriage forward and backward, the pusher carriage cylinder having a pushing-out direction opposite to a pushing-out direction of the pusher main body cylinder.

(2) The pusher according to (1), wherein the pusher carriage is connected to a cylinder main body of the pusher main body cylinder and is connected to a rod of the pusher carriage cylinder.

(3) The pusher according to (1) or (2), wherein the pusher carriage is configured to move in parallel with a direction in which the pusher main body is moved forward and backward.

(4) The pusher according to (3), wherein the pusher further comprises a frame that support the pusher carriage and the pusher main body as a unit.

(5) The pusher according to any one of (1) to (4), wherein the pusher further comprises a guide member configured to guide the pusher carriage.

(6) The pusher according to any one of (1) to (5), wherein the pusher main body cylinder is at least partly accommodated in the pusher main body.

(7) The pusher according to any one of (1) to (6), wherein the pusher main body is divided into at least three parts in a width direction relative to a traveling direction of the pusher main body.

(8) The pusher according to any one of (1) to (7), wherein the pusher is disposed to feed a source iron into an electric arc melting facility.

(9) An electric arc melting facility comprising a melting chamber configured to melt a source iron wherein the pusher according to any one of (1) to (7) is disposed to feed the source iron into the melting chamber.

Advantageous Effects of Invention

According to the present invention, the traveling distance necessary for the pusher main body is the sum total of the traveling distance of the pusher main body relative to the pusher carriage and the traveling distance of the pusher carriage. This arrangement can make the installation space of the pusher smaller as compared with a case where a single cylinder takes entirely on the traveling distance of the pusher main body. In this case, the pusher can be designed compact as a whole, while assuring a sufficiently large stoke, and so the pusher can be designed installable even in an area where the space for installing the pusher is narrow. Further, the pushing-out direction of the pusher main body cylinder and the pushing-out direction of the pusher carriage cylinder are set opposite to each other. This arrangement can make it possible to move the pusher main body with almost the same driving force in the forward and backward directions, without increasing the cylinder diameter. Consequently, when the pusher main body is restrained, the pusher main body can be moved backward by a sufficiently large driving force to release it from the restraint state.

EMBODIMENT FOR CARRYING OUT THE INVENTION

An embodiment of the present invention will be described below in detail with reference to the accompanying drawings.

Figure 1:
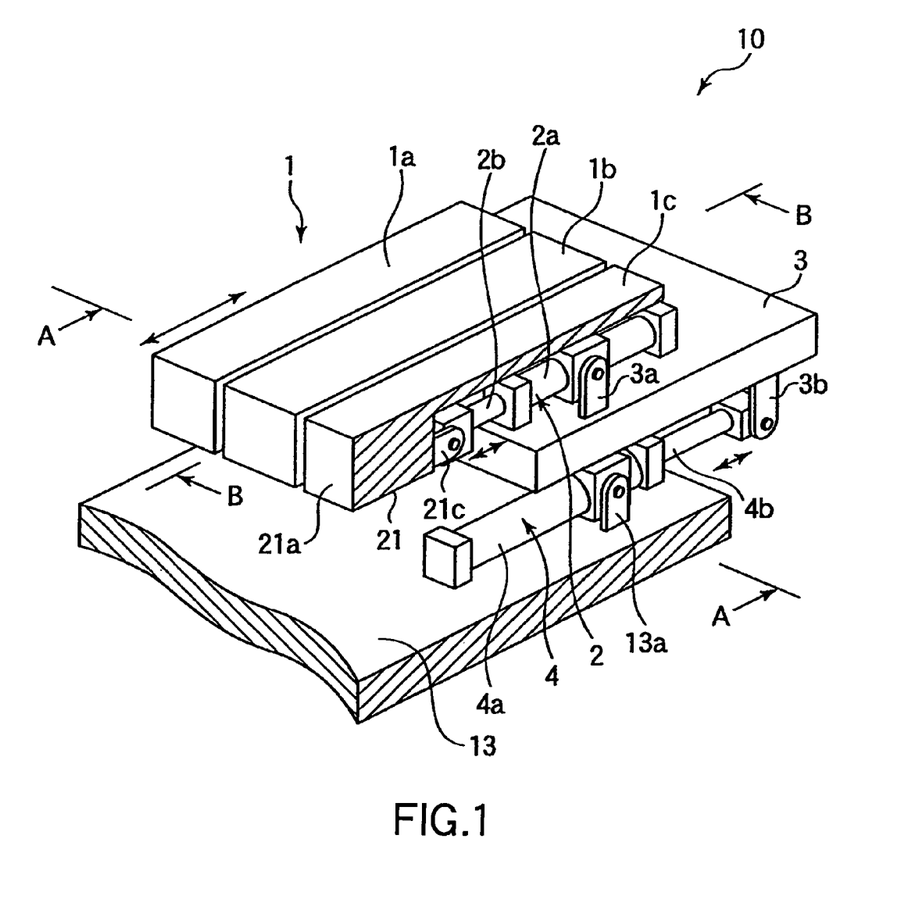
[FIG. 1] This is a perspective view showing a pusher according to an embodiment of the present invention.

FIG. 1 is a perspective view showing a pusher according to an embodiment of the present invention.

Figure 2:
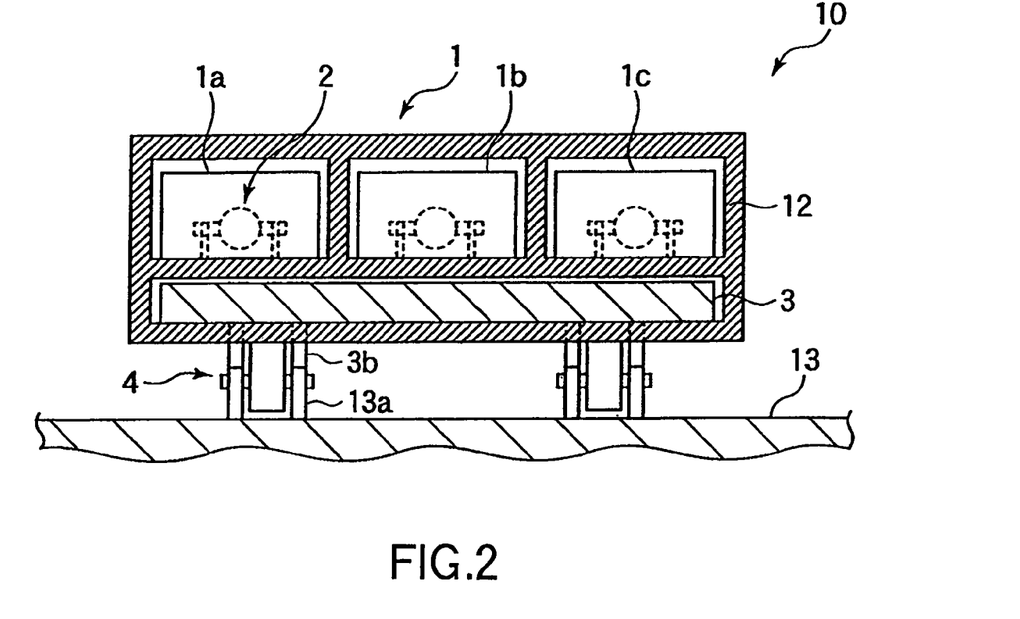
[FIG. 2] This is a sectional view showing a cross section taken along a line A-A in FIG. 1.
Figure 3:
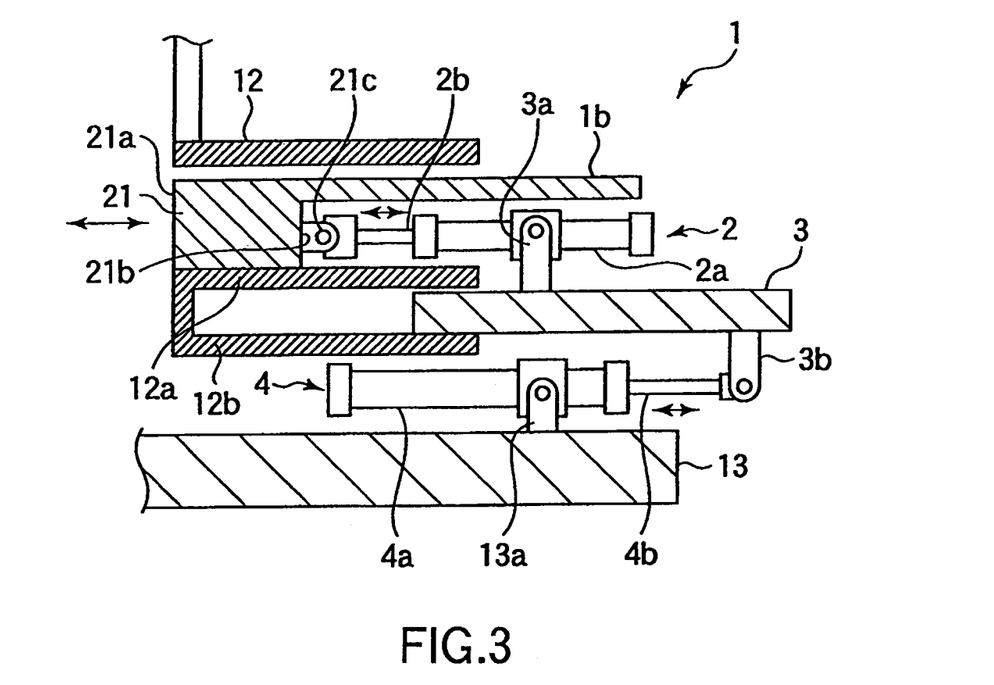
[FIG. 3] This is a sectional view showing a cross section taken along a line B-B in FIG. 1.

FIG. 2 is a sectional view showing a cross section taken along a line A-A in FIG. 1. FIG. 3 is a sectional view showing a cross section taken along a line B-B in FIG. 1.

As shown in these drawings, the pusher 10 includes a pusher main body 1 for pushing forward a target object to feed or transfer the target object; pusher main body cylinders 2 for driving the pusher main body 1; a pusher carriage 3 that supports the pusher main body cylinders 2; and pusher carriage cylinders 4 for driving the pusher carriage 3. The pusher carriage cylinders 4 are connected to a base member 13.

In this embodiment, the pusher main body 1 has a tri-divided structure formed of pusher main bodies 1a, 1b, and 1c, which are separated from each other in the width direction (horizontal direction). Each of the pusher main bodies 1a, 1b, and 1c has a thrusting portion 21 at the distal end, the front surface of which serves as a thrusting face 21a to come into contact with the target object. Each of the pusher main bodies 1a, 1b, and 1c includes a bore formed therein at a position on the back of the thrusting portion 21, such that the corresponding pusher main body cylinder 2 is at least partly accommodated inside the bore.

Each of the pusher main body cylinders 2 is formed of, e.g., a hydraulic cylinder, which includes a cylinder main body 2a and a rod 2b reciprocable outward and inward relative to the cylinder main body 2a.

Each of the pusher carriage cylinders 4 is formed of, e.g., a hydraulic cylinder, which includes a cylinder main body 4a and a rod 4b reciprocable outward and inward relative to the cylinder main body 4a.

Each of the pusher main body cylinders 2 and the pusher carriage cylinders 4 is preferably formed of a hydraulic cylinder, but it may be formed of a cylinder of another type, such as a pneumatic cylinder. In the following explanation, it is defined such that the direction in which the rod is moved forward from the cylinder main body is a pushing-out direction and the direction in which the rod is moved backward into the cylinder main body is a pulling-in direction.

Each of the pusher main bodies 1a, 1b, and 1c is connected by a connecting member 21c to the rod 2b of the corresponding pusher main body cylinder 2 at a face 21b opposite to the thrusting face 21a of the thrusting portion 21. The pusher main bodies 1a, 1b, and 1c are moved forward and backward by driving the pusher main body cylinders 2 to push forward the target object. In the following explanation, it is defined such that the movement of the pusher main bodies 1a, 1b, and 1c to push forward the target object is a forward movement and the movement of the pusher main bodies 1a, 1b, and 1c to return to a position, set before the pushing forward, is a backward movement.

The cylinder main body 2a of each of the pusher main body cylinders 2 is connected to the top surface of the pusher carriage 3 by a connecting member 3a. The rod 4b of each of the pusher carriage cylinders 4 is connected to the bottom surface of the pusher carriage 3 by a connecting member 3b. Further, the cylinder main body 4a of each of the pusher carriage cylinders 4 is connected to the base member 13 by a connecting member 13a.

With the connection arrangement described above, when the pusher carriage 3 is moved by driving the pusher carriage cylinders 4, the pusher main body cylinders 2 and the pusher main body 1 (1a, 1b, and 1c) connected to the pusher carriage 3 are also moved together with the pusher carriage 3.

As regards the connecting member 21c connecting each of the pusher main bodies 1 to the corresponding pusher main body cylinder 2, the connecting member 3a connecting each of the pusher main body hydraulic cylinders 2 to the pusher carriage 3, and the connecting member 3b connecting the pusher carriage 3 to each of the pusher carriage cylinders 4, the connecting method for them can be an arbitrary method. However, it is preferable for them to connect portions to be rotatable to provide flexibility at least on a certain plane.

The group of the pusher main body cylinders 2 and the group of the pusher carriage hydraulic cylinders 4 are arranged such that the pushing-out directions of their rods are opposite to each other. With this arrangement, the direction in which the pusher main body 1 is moved backward is the same as the pushing-out direction of the pusher carriage cylinders 4, so that the backward movement of the pusher main body 1 is made with a force larger than that with which the forward movement of the pusher main body 1 is made.

The pusher carriage 3 and the pusher main body 1 are supported by a frame 12 (shown only in FIGS. 2 and 3) as a unit. The frame 12 includes two guide portions 12a and 12b on upper and lower sides, wherein the upper guide portion 12a guides the bottom surface of the pusher main body 1 (1a, 1b, and 1c), and the lower guide portion 12b guides the bottom surface of the pusher carriage 3. The frame 12 is disposed in parallel with the direction in which the pusher main body 1 is moved forward and backward. The sliding surfaces between the pusher main body 1 and the upper guide portion 12a and the sliding surfaces between the pusher carriage 3 and the lower guide portion 12b are preferably formed of "OILES" (Registered™) metal or the like to make their movement smoother.

Next, an explanation will be given of an operation of the pusher 10 structured as described above.

When the pusher main body 1 is retreated at the backward limit position, the rods 2b of the pusher main body cylinders 2 are in the shortest state (contraction limit) while the rods 4b of the pusher carriage cylinders 4 are in the longest state (extension limit).

From these states, the rods 2b of the pusher main body cylinders 2 are moved in the pushing-out direction and/or the rods 4b of the pusher carriage cylinders 4 are moved in the pulling-in direction so that the pusher main body 1 is moved forward. Consequently, the pusher main body 1 pushes forward the target object to feed or transfer the target object.

The traveling distance (stroke) of the pusher main body 1 at this time is expressed by the sum total of the stroke of each of the pusher main body cylinders 2 and the stroke of each of the pusher carriage cylinders 4. Specifically, the traveling distance necessary for the pusher main body 1 is the sum total of the traveling distance of the pusher main body 1 relative to the pusher carriage 3 and the traveling distance of the pusher carriage 3. This arrangement can make the installation space of the pusher 10 smaller as compared with a case where a single cylinder takes entirely on the traveling distance (stroke) of the pusher main body 1. In this case, the pusher 10 can be designed compact as a whole with the pusher main body 1 provided with a sufficiently large stoke. Consequently, the pusher can be designed installable even in an area where the space for installing the pusher is narrow.

Further, the pusher main body cylinders 2 are at least partly accommodated in the pusher main body 1, and so the pusher 10 can be further compact as a whole. However, it is not essential to at least partly contain the pusher main body cylinders 2 in the pusher main body 1.

Further, the pushing-out direction of the pusher main body cylinders 2 and the pushing-out direction of the pusher carriage cylinders 4 are set opposite to each other, and so the pusher main body 1 can be moved with almost the same driving force in the forward and backward directions. Consequently, when the pusher main body 1 is restrained, the pusher main body can be moved backward by a sufficiently large driving force to release it from the restraint state, without increasing the cylinder diameter.

Further, the pusher main body 1 has a tri-divided structure formed of pusher main bodies 1a, 1b, and 1c, which are separated from each other in the width direction and are respectively connected to the pusher main body cylinders 2. Consequently, for example, when the pusher main body 1a is restrained by the target object chewed up and jammed in there, the pusher main bodies 1b and 1c other than the restrained one can be driven to continue the operation of pushing forward the target object.

As a matter of course, the pusher main body 1 can have an integrated structure or can have a divided structure other than the tri-divided structure. However, restraint on the pusher main body 1 due to the target object jammed therein can occur not only at the bottom of the pusher main body 1 but also at the either side of the pusher main body 1, and the restraint can relatively easily occur at the either lateral side of the pusher main body 1. Accordingly, in a case where the pusher main body 1 has a divided structure, the pusher main body 1 is preferably divided into three or more parts in the width direction (horizontal direction) relative to the traveling direction of the pusher main body, so that it can serve for the running operation continuously for a long period of time. The number of divided parts should have an upper limit determined by the facility restrictions, and the number of divided parts is eight or less in practice. The divided parts of the pusher main body are not necessary required to have the same size, and, for example, the tri-divided structure may be designed such that the central part is larger and the two lateral side parts, which can be easily restrained, are smaller. Further, the divided parts of the pusher main body (pusher main bodies 1a to 1c in this embodiment) are respectively connected to the pusher main body cylinders 2. However, the number of the pusher main body cylinders connected to the divided parts of the pusher main body is not necessary required to be the same as the number of the divided parts of the pusher main body. For example, in a case where the pusher main body is divided to have a larger central part, a plurality of cylinders may be connected to the central part.

Furthermore, the integrated frame 12 is structured to support the pusher carriage 3 and the pusher main body 1 such that the upper guide portion 12a of the frame 12 guides the bottom surface of the pusher main body 1 (1a, 1b, 1c) and the lower guide portion 12b guides the bottom surface of the pusher carriage 3. In this case, the pusher main body 1 and the pusher carriage 3 can be easily moved in predetermined directions. The pusher carriage 3 is preferably supported so that it is movable in parallel with the direction in which the pusher main body 1 is moved forward and backward. In this respect, since the frame 12 is disposed as described above, the traveling direction of the pusher carriage 3 can be set in parallel with the direction in which the pusher main body 1 is moved forward and backward.

Further, the pusher main body 1, pusher main body cylinders 2, pusher carriage 3, and pusher carriage cylinders 4 are disposed in this frame 12, and so these facilities can be easily treated together as one unit. The integration of these facilities by use of the frame 12 can provide the effect of shortening the installation time of the pusher facilities as a whole and the effect of shortening the maintenance time because they are replaceable as a unit.

However, the frame 12 is not essential but is omitted, for example, if the traveling directions of the pusher main body 1 and the pusher carriage 3 can be easily set. Further, without using the frame, a guide for the pusher carriage 3 may be simply used.

Next, an explanation will be given of a case where the pusher 10 according to this embodiment described above is used for feeding a source iron to an electric arc melting facility.

Figure 4:
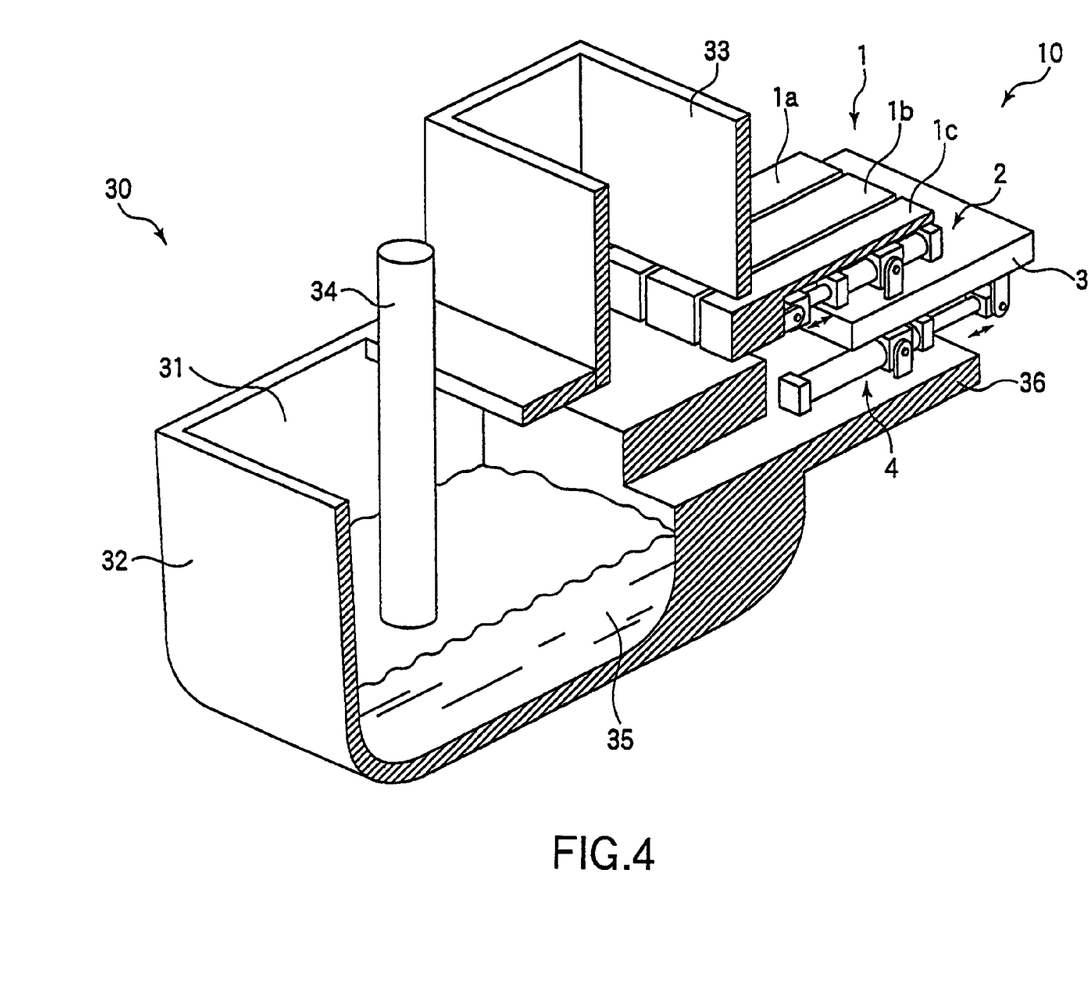
[FIG. 4] This is a partially sectional perspective view showing an electric arc melting facility to which the pusher according to an embodiment of the present invention is applied.

FIG. 4 is a partially sectional perspective view showing an electric arc melting facility to which the pusher according to an embodiment of the present invention is applied. The electric arc melting facility 30 includes a melting furnace 32 defining a melting chamber 31 configured to melt a source iron, such as scrap; a preheating chamber 33 directly connected to an upper side of the melting furnace 32 and configured to preheat the source iron charged therein by the exhaust gas generated in the melting chamber 31; and an arc electrode 34 configured to generate an electric arc for melting the source iron inside the melting chamber 31. The source iron is melted by the electric arc generated by the arc electrode 34, and molten steel 35 thereby produced is stored in the melting chamber 31. The preheating chamber 33 is equipped with a source iron feeding means (not shown) disposed on the upper side to feed the source iron into the preheating chamber 33. The melting furnace 32 has a tap hole (not shown) formed in the sidewall to tap molten steel produced inside the melting furnace 32.

A table member 36 extends in a horizontal direction from one side of the melting furnace 32. A pusher 10 is disposed on the table member 36 serving as the base, wherein the pusher 10 has the same structure as that shown in FIG. 1. Specifically, the pusher carriage cylinders 4 are connected to the table member 36. The rods 4b of the pusher carriage cylinders 4 are connected to the bottom surface of the pusher carriage 3. The cylinder main bodies 2a of the pusher main body cylinders 2 are connected to the top surface of the pusher carriage 3. The rods 2b of the pusher main body cylinders 2 are connected to the pusher main body 1 (pusher main bodies 1a, 1b, and 1c). The pusher main body cylinders 2 and/or the pusher carriage cylinders 4 are driven so that the pusher main body 1 (pusher main bodies 1a, 1b, and 1c) is moved forward and backward. When the pusher main body 1 is moved forward, it pushes forward the source iron from inside the preheating chamber 33 into the melting chamber 31.

Figure 6:
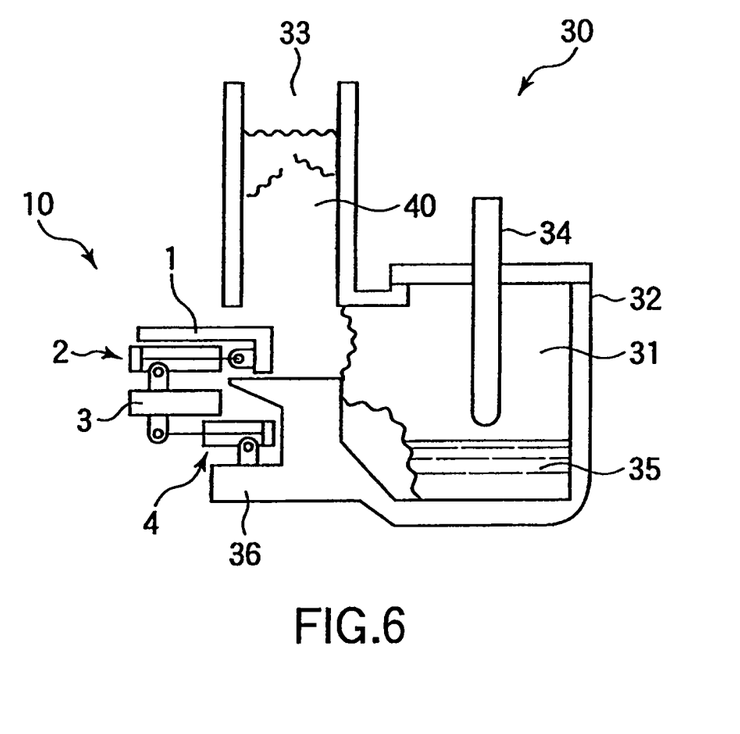
[FIG. 6] This is a schematic view showing an operation of the pusher in the electric arc melting facility shown in FIG. 4, in a state where the pusher main body is in the middle of performing the pushing-out.
Figure 7:
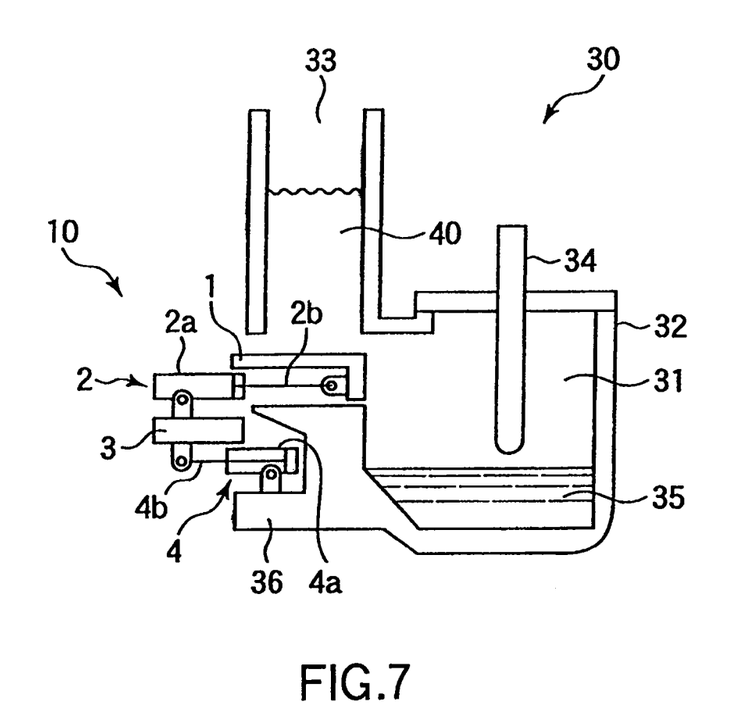
[FIG. 7] This is a schematic view showing an operation of the pusher in the electric arc melting facility shown in FIG. 4, in a state where the pusher main body is set at the forward limit.

Next, with reference to FIGS. 5 to 7, an explanation will be given of an operation of the pusher 10 performed while the source iron is melted by the electric arc melting facility 30 to manufacture molten steel.

Figure 5:
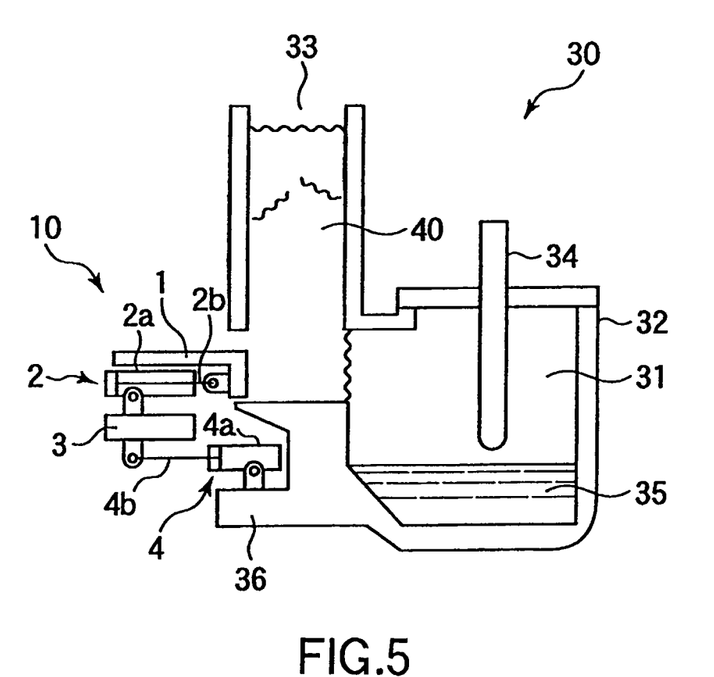
[FIG. 5] This is a schematic view showing an operation of the pusher in the electric arc melting facility shown in FIG. 4, in a state where the pusher main body has been retreated to a position at the backward limit.

FIG. 5 shows a state, after the tapping of the preceding charge is finished, in which the source iron 40 is fed and preheated in the preheating chamber 33 of the electric arc melting facility 30, with the pusher main body 1 retreated to the backward limit position. At this time, the pusher main body cylinders 2 are in the shortest state (contraction limit), while the pusher carriage cylinders 4 are in the longest state (extension limit).

In the ordinary running operation, the pusher carriage 3 is set at an almost constant position, and only the pusher main body cylinders 2 are moved forward and backward to feed the source iron 40 into the melting chamber 31. When an abnormality occurs such that the pusher main body 1 is restrained by the source iron chewed up and jammed in at the pusher main body 1, the pusher carriage 3 is moved forward and backward by the pusher carriage cylinders 4 to solve the restraint on the pusher main body 1.

When the running operation starts from the state shown in FIG. 5, the scrap is fed into the melting chamber 31, as follows. At first, the pusher carriage cylinders 4 are driven to move the rods 4b in a direction to be pulled in and shortened (pulling-in direction) so as to move the pusher carriage 3 forward. This is made to bring about a state, as shown in FIG. 6, in which the rods 4b of the pusher carriage cylinders 4 are set at the contraction limit and the pusher carriage 3 is set at the most forward position (forward limit). The pusher main body cylinders 2 are moved forward along with the pusher carriage 3 moved forward, and so the pusher main body 1 is moved forward to start pushing forward the source iron 40 into the melting chamber 31. Thereafter, in the ordinary running operation, the pusher carriage 3 is maintained at this position.

Then, the pusher main body cylinders 2 are driven in the pushing-out direction until the extension limit. Consequently, the pusher main body 1 is moved forward and the pusher carriage 3 and the pusher main body 1 are set at the positions of the forward limit, as shown in FIG. 7.

As described above, according to the pusher 10, the necessary traveling distance of the pusher main body 1 can be the sum total of the traveling distance of the pusher main body 1 relative to the pusher carriage 3 and the traveling distance of the pusher carriage 3. Consequently, the pusher 10 can be designed compact as a whole, while assuring a sufficiently large stoke.

Further, the pushing-out direction of the pusher main body cylinders 2 and the pushing-out direction of the pusher carriage cylinders 4 are set opposite to each other, and so the pusher main body 1 can be moved with almost the same driving force in the forward and backward directions. Consequently, when the source iron is jammed in, the pusher main body 1 can be moved backward by a sufficiently large driving force to easily release it from the restraint state.

In particular, the electric arc melting facility of this type can easily suffer restraint on the pusher main body 1 due to the source iron jammed therein. Such restraint on the pusher main body 1 due to the jammed source iron can easily occur at the either side of the pusher main body 1 as well as at the bottom of the pusher main body 1. Accordingly, in a case where the pusher is used for electric arc melting facilities, the pusher main body is preferably divided into three or more parts in the width direction (horizontal direction) relative to the traveling direction of the pusher main body, so that it can serve for the running operation continuously for a long period of time.

The present invention is not limited to the embodiment described above, but can be modified in various alterations within the scope of the general concept of the present invention.

For example, in the embodiment described above, the pusher main body cylinders 2 are disposed above the pusher carriage 3, and the pusher carriage cylinders 4 are disposed below the pusher carriage 3. However, this is not limiting, and the positions of these groups of cylinders may be set opposite, or at least one of these groups of cylinders may be disposed on the lateral sides of the pusher carriage 3. However, the pusher main body cylinders 2 are preferably disposed above the pusher carriage 3.

Further, in the embodiment described above, the pusher carriage 3 is slid. However, this is not limiting, and the pusher carriage 3 may be moved by other means, such as traveling by wheels.

Example

A test of melting scrap to manufacture molten steel was performed by use of the same electric arc melting facility as that shown in FIG. 1, wherein the facility had a furnace capacity of about 200 tons and was equipped with the pusher according to the present invention.

The position of the pusher carriage 3 during the melting period of melting scrap was set by operating the pusher carriage cylinders 4 formed of hydraulic cylinders to move the pusher carriage 3 forward into the furnace by 500 mm. In this state, the pusher main body cylinders 2 formed of hydraulic cylinders were operated by repeating forward and backward movements of the pusher main body 1 with a stroke of 2,000 mm to feed the scrap from inside the preheating chamber 6 into the melting chamber 7. The driving of the pusher 10 was turned on and off by use of a control unit.

During the running operation, there occurred a situation in which the pusher main body 1 became immovable and this restraint on the pusher was not solved by applying hydraulic pressures to the pusher main body cylinders 2 several times in the forward and backward directions. In order to solve this situation, the pusher carriage cylinders 4 were operated in the direction to move the pusher main body 1 backward. Consequently, the restraint on the pusher main body 1 was solved. Then, the pusher carriage 3 was reset in the state moved forward by 500 mm, and feeding of the scrap was restarted by operating the pusher main body 1 to repeat the forward and backward movements. Consequently, the running operation was allowed to continue.

Industrial Applicability

The pusher according to the present invention can be applied not only to the electric arc melting facility described above, but also to charging devices and thrusting devices used in facilities for processing industrial wastes, such as plastic wastes, incinerating furnaces, and chemical factories and plants for treating process objects in a range of from solid substances to liquid-like solid substances having certain viscosities.

Reference Signs List 1, 1a, 1b, 1c pusher main body
2 pusher main body cylinder
3 pusher carriage
4 pusher carriage cylinder
10 pusher
12 frame
13 base
30 electric arc melting facility
31 melting chamber
32 melting furnace
33 preheating chamber
34 arc electrode
35 molten steel
36 table member
40 source iron

The invention claimed is:

1. A pusher comprising:
a pusher main body configured to push forward a target object;
a pusher main body cylinder connected to the pusher main body and configured to move the pusher main body forward and backward;
a pusher carriage connected to the pusher main body cylinder and disposed underneath the pusher main body;
a pusher carriage cylinder connected to the pusher carriage and configured to move the pusher carriage forward and backward and thereby translate the pusher main body, the pusher carriage cylinder having a pushing-out direction opposite to a pushing-out direction of the pusher main body cylinder so that the pusher main body is moved forward when the pusher main body cylinder is driven in the pushing-out direction and the pusher main body is moved backward when the pusher carriage cylinder is driven in the pushing-out direction; and
an upper guide portion and a lower guide portion both attached to the pusher main body,
wherein the pusher carriage moves forward and backward in between the upper guide portion and the lower guide portion.

2. The pusher according to claim 1, wherein the pusher carriage is connected to a cylinder main body of the pusher main body cylinder and is connected to a rod of the pusher carriage cylinder.

3. The pusher according to claim 1, wherein the pusher carriage is configured to move in parallel with a direction in which the pusher main body is moved forward and backward.

4. The pusher according to claim 3, wherein the pusher further comprises a frame that support the pusher carriage and the pusher main body as a unit.

5. The pusher according to claim 1, wherein the pusher further comprises a guide member configured to guide the pusher carriage.

6. The pusher according to claim 1, wherein the pusher main body cylinder is at least partly accommodated in the pusher main body.

7. The pusher according to claim 1, wherein the pusher main body is divided into at least three parts in a width direction relative to a traveling direction of the pusher main body.

8. The pusher according to claim 1, wherein the pusher is disposed to feed a source iron into an electric arc melting facility.

9. The pusher of claim 1, wherein the upper guide portion guides a bottom surface of the pusher main body and a lower guide portion guides a bottom surface of the pusher carriage.

* * * * *